Figure 1:
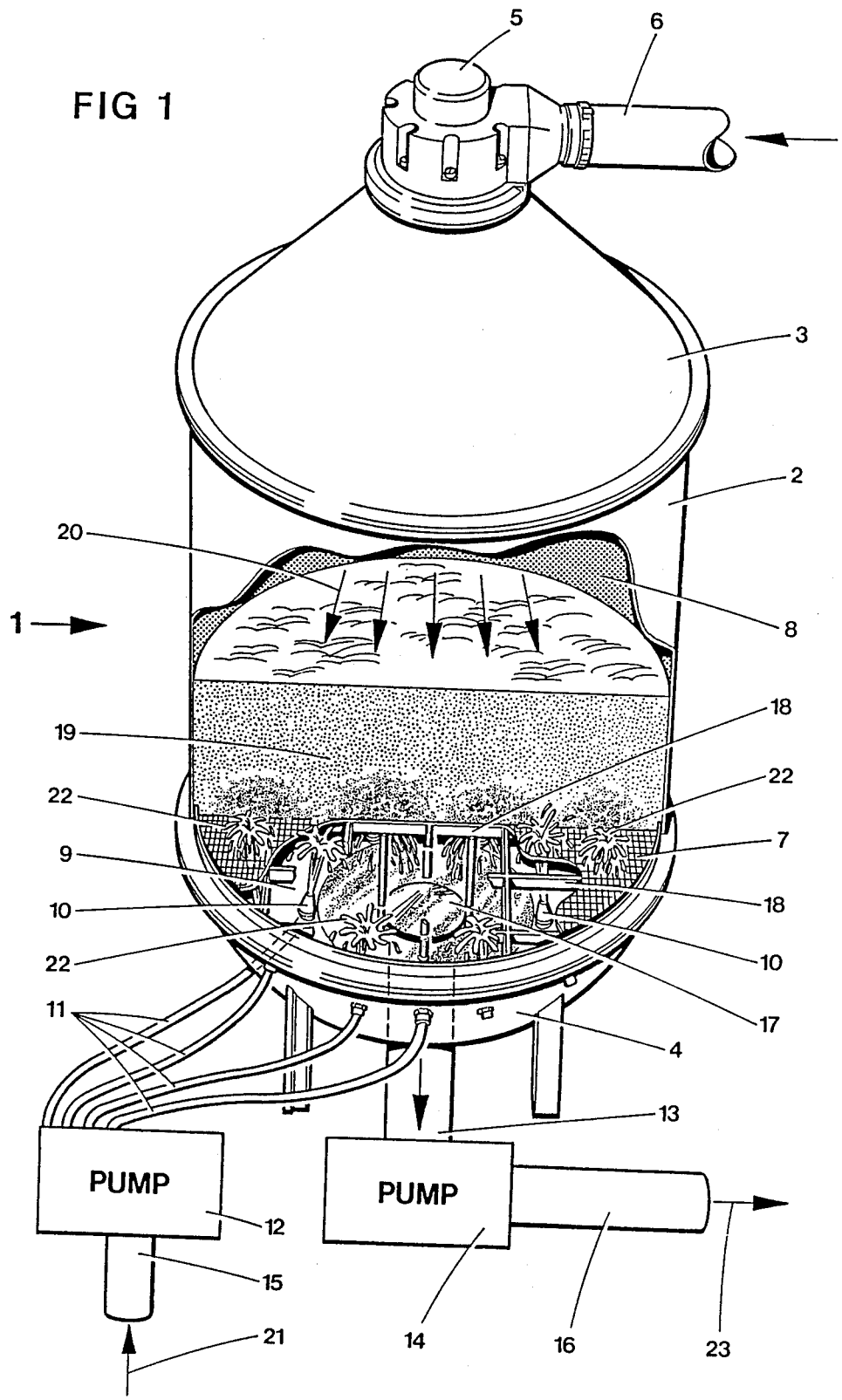

United States Patent [19]

Fagrell

[11] Patent Number: 4,816,222
[45] Date of Patent: Mar. 28, 1989

[54] METHOD AND APPARATUS FOR OBTAINING A SUSPENSION AND SOLUTION

[76] Inventor: Per-Ake Fagrell, Stenstorp Gard, Varv, S-591 90 Motala, Sweden

[21] Appl. No.: 44,995

[22] Filed: Apr. 30, 1987

Related U.S. Application Data

[63] Continuation-in-part of Ser. No. 734,266, May 9, 1985, abandoned.

[30] Foreign Application Priority Data

Sep. 22, 1983 [SE] Sweden ............................. 8305116

[51] Int. Cl.$^4$ ............................................. B01D 11/02
[52] U.S. Cl. ................................... 422/261; 422/224; 422/255; 422/267; 422/275; 71/64.08; 23/293 R
[58] Field of Search ............. 23/293 R; 422/224, 255, 422/261, 267, 275; 71/64.08

[56] References Cited

U.S. PATENT DOCUMENTS

| | | | |
|---|---|---|---|
| 1,060,010 | 4/1913 | Murray et al. | 422/261 |
| 2,243,982 | 7/1940 | Dahlin | 71/64.08 |
| 2,281,140 | 4/1942 | Courthope et al. | 422/261 |
| 2,762,510 | 9/1956 | Gwyn et al. | 422/261 |
| 3,363,995 | 1/1968 | Driskell et al. | 422/261 |
| 3,800,026 | 3/1974 | Morgan | 422/261 |
| 4,343,621 | 8/1982 | Benninger et al. | 23/293 R |
| 4,462,511 | 7/1984 | Fulmer et al. | 422/261 |

FOREIGN PATENT DOCUMENTS

645384 11/1950 United Kingdom ............... 422/261

*Primary Examiner*—John Doll
*Assistant Examiner*—Robert M. Kunemund
*Attorney, Agent, or Firm*—Albert L. Jeffers

[57] ABSTRACT

The present invention relates to a method to obtain a suspension and/or a solution of limestone powder in water. The limestone powder is placed on a grating (7) of such a mesh size that only a negligible quantity of the powder by itself passes through the grating (7) of such a mesh size that only a negligible quantity of the powder by itself passes through the grating (7). The grating is sprayed from underneath with water from several nozzles (10) so positioned that the main part of the surface of the grating (7) is sprayed. At least a part of the water passes by this through the grating (7), loosens and/or dissolves the powdered limestone and carries this with it when the water runs back through the grating (7). The water and the suspended and/or dissolved limestone powder in it are collected under the grating (7). The apparatus is also equipped with a vibrating device and has a sedimentation container in the lower portion of the container.

13 Claims, 3 Drawing Sheets

METHOD AND APPARATUS FOR OBTAINING A SUSPENSION AND SOLUTION

This application is a continuation-in-part of U.S. Patent Application Ser. No. 734,266, filed May 9, 1985, now abandoned.

This invention relates to a method for obtaining a suspension and/or a solution of limestone powder in water, whereby the limestone powder is placed in a container having a grating with a mesh size such that only a negligible quantity of the powder falls through the grating by itself. The grating is typically sprayed from underneath with water which thereby loosens and/or dissolves the limestone powder and carries it away as the water filters back through the grating. The water with the suspended and/or dissolved limestone powder is collected under the grating, filtered and transported for use.

Lime is typically used to raise the pH value of an acidic lake, river, stream or the like. In the past it has typically been applied in dust or powdered form, and the lime slowly sinks to the bottom and is gradually dissolved, thereby reducing the acidity of the body of water.

The drawback associated with spreading lime in powdered form is that the powder can be carried away by the wind and spread to undesired areas. This in turn can be harmful to the environment and consequently greater control over spreading the lime is achieved by using a suspension thereof. Apparatuses for spreading powdered material and liquids have been employed in the past, but such apparatus are not specifically adaptable for spreading powdered material such as lime, and especially quick lime. These apparatus, for all intents and purposes, have proven to be totally unsatisfactory for lime and quick lime applications.

Another reason for suspending the lime in water, before it is spread, is that the dissolution process from lime to carbonate begins earlier than when dry lime powder is spread. In this way a further benefit of the lime is obtained since a more exact determination of the lime required can be made. This results in an overall saving with respect to both the quantity of lime and the apparatus spreading the lime.

An object of the present invention is to improve upon the method for suspending and/or dissolving limestone powder, especially quick lime, in water. Water is sprayed from a plurality of nozzles positioned so that the main part of the grating surface is sprayed under substantially equal conditions.

It is important to note that quick lime is a by-product produced by many factories and is consequently very plentiful. In fact, most factories experience difficulty in disposing of the quick lime by-product that they produce during their manufacturing process. Therefore, quick lime is very inexpensive and readily available source for lowering the acidity of waterways. However, quick lime typically includes sand and other undissolved impurities which tend to clog and eventually jam up conventional devices. The present invention is directed at a method and apparatus which is specifically designed for lime, especially quick lime, and other powdered mixtures which may contain undissolvable impurities.

The apparatus and method of the invention are characterized in that several nozzles, pointed at the grating, are arranged in the lower chamber to spray liquid under pressure against the grating, thereby dissolving and/or washing away the lime and/or sedimentation toward the bottom of the apparatus where all the undissolved solids are collected in a sedimentation container. The limestone suspension and/or solution then flows upward through a filter means and finally through the apparatus outlet. The apparatus is also equipped with vibration means for preventing arching of the limestone powder, when the apparatus is run continuously or for long periods of time.

Figure 2:
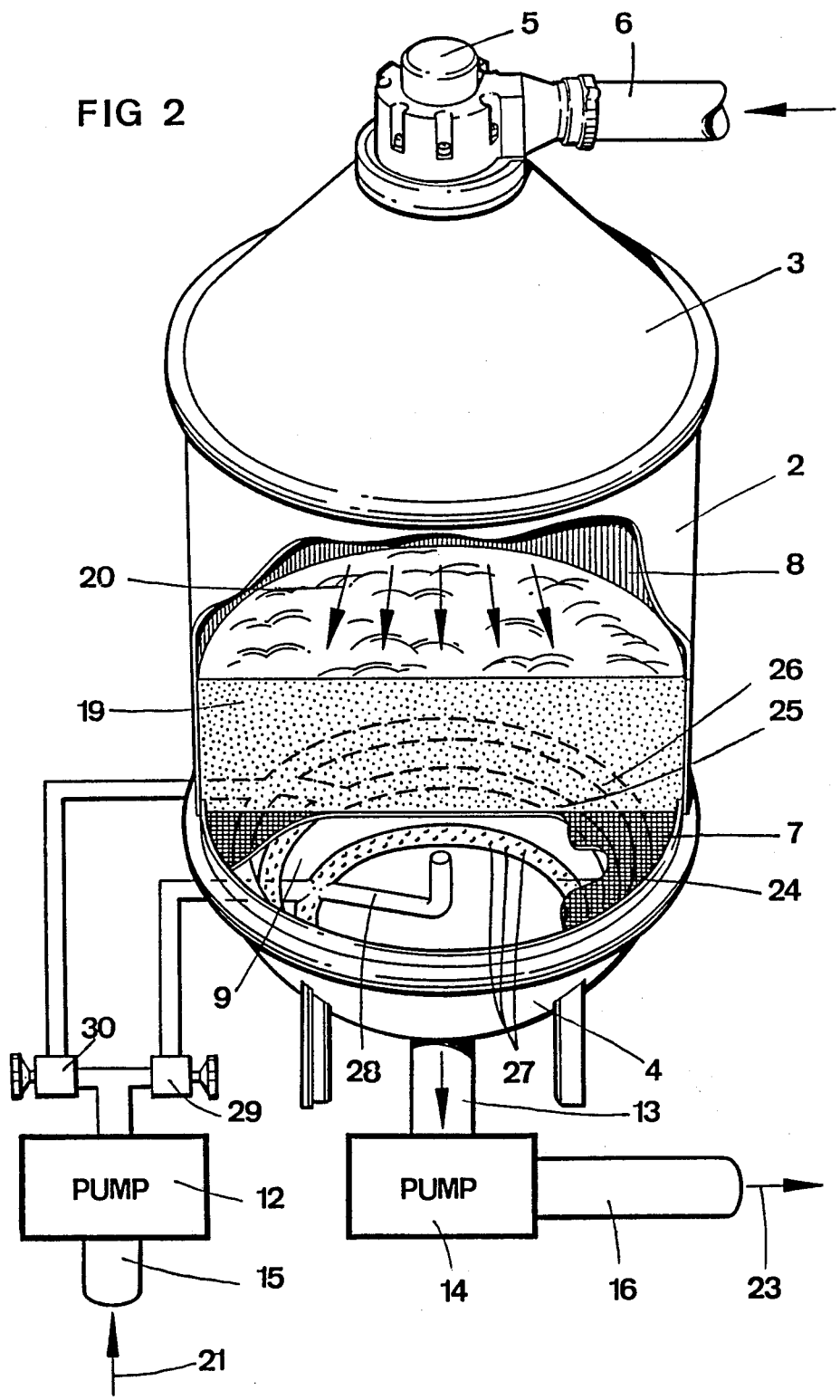
Figure 3:
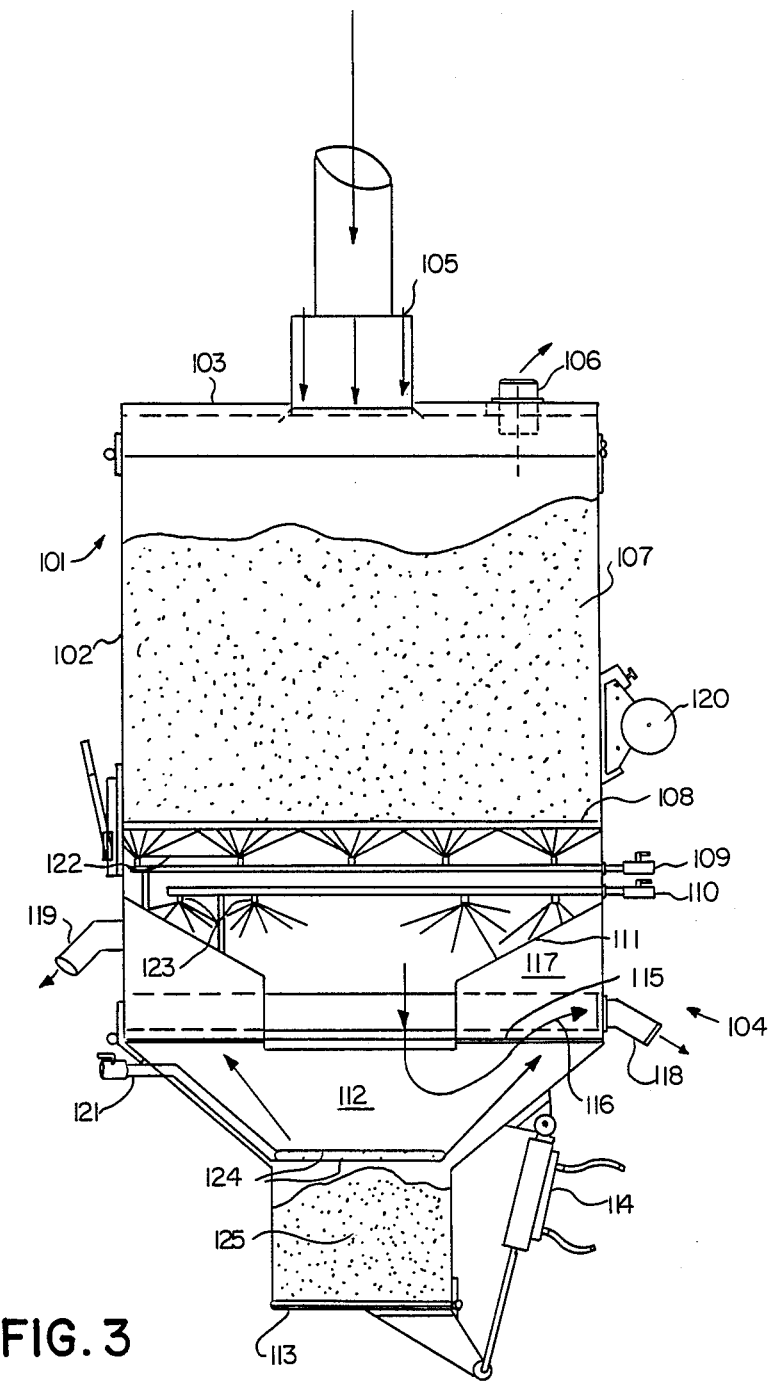

The invention shall be further described with reference to the accompanying drawings in which FIGS. 1, 2 and 3 show three different embodiments of the apparatus in accordance with the invention. Said apparatuses can be stationarily placed by a moving water body or be placed on a mobile barge or float for transporting the suspended and/or dissolved limestone slurry to required areas.

An apparatus which works according to the method of the invention consists of a tank 1 with a center cylindrical part 2, an upper conical part 3 and a lower, half spherical part 4. In the tip of the conical part 3 is an opening to which a suction apparatus 5 with a suction hose 6 are connected. The tank 1 is divided by a horizontally positioned grating or net 7 into an upper chamber 8, composed of sections 2 and 3, and a lower chamber 9, composed of section 4. The grating 7 lies on thin positioned beams 18. Into the lower chamber 9 protrude several nozzles 10 pointed at the grating 7 which are connected with the pressure side of a pump 12 by hoses 11. The nozzles 10 are pointed so that they spray substantially the entire under surface of the grating 7 and are especially positioned concentrically around a centrally placed drainage opening in the bottom of the half spherical chamber 4, which is connected with the suction side of a pump 14 by a pipe 13. The suction side of the pump 12 connected to a water source by a pipe 15 and the pressure side of the pump 14 is connected by a pipe 16 with a nozzle not shown in the drawing. A cap 17 is positioned over the drainage opening which covers the opening from above, but allows free access from the sides.

The apparatus of the invention works in the following way: limestone powder 19 is loaded into the upper chamber 8 as indicated by arrows 20. The powder is taken continuously with the help of the suction apparatus 5 through the hose 6 from a store room or the like in which limestone powder is possibly stored in large sacks each holding about 500 kg. Alternatively the conical part 3 can be inverted and used as a hopper, in which case the suction apparatus 5 and the pipe 6 become superfluous because the large sacks can be emptied directly into the hopper.

The limestone powder is supported by the grating 7, which has such a mesh size that only a negligible quantity runs into the lower chamber 9 by itself. Water is pumped under pressure by pump 12, indicated with an arrow 21, through the nozzle 10 in the form of jets 22 against the grating 7. The water in the jets penetrates through the grating 7 and carries with it limestone powder in the form of a lime suspension when it runs by gravity back through the grating 7 and down into the lower chamber 9. The lime suspension which collects in the lower chamber 9 is pumped out by the pump 14 and is sprayed out over the water body whose pH value shall be raised as indicated by an arrow 23.

In the embodiment according to FIG. 2, in which corresponding or identical parts of the apparatus has the same reference numerals as in FIG. 1, in which the main difference is the spraying means, i.e., the nozzles 10 of the apparatus showed in FIG. 1. The spraying means for this apparatus comprises three concentric ring shaped tubes 24, 25, 26 each of different diameter and with a plurality of nozzle openings 27 distributed over their upper sides. The tube 24 which is interconnected to a central nozzle 28, is connected via a valve 29 to the pressure pump 12. The tubes 25 and 26 are interconnected and are also connected, via a valve 30 to the pump 12.

The advantage of the embodiment of the spraying means according to FIG. 2 is that a more even distribution of water over the surface of the grating 7 is achieved. Furthermore, by means of the valves 29, 30 it is also possible to change the concentration of powdered limestone in the water with respect to the pH-value of the water and the water depth.

The apparatus shown in FIG. 3 operates similarly to the previous two embodiments and so only the differences will be explained in detail. The apparatus includes a tank 101 having a cylindrical center part 102 with an upper cover 103 and a lower chamber generally depicted as 104. The cover 103 has an opening 105 in which air, accompanied by lime or quick lime, is either pumped or sucked into container 101 while the air or other gases are exhausted out through outlet 106 of cover 103. The quick lime 107 is then collected in tank 101 on top of grating 108 and maintained there until subsequently dissolved by sprayed water to form the limestone suspension. A stop valve 109 controls the amount of water sprayed from underneath by nozzles 122 for turning the quick lime into hydrated lime, while a second stop valve 110 supplies water through nozzles 123 for adjusting the concentration of the limestone suspension (calcium hydroxide solution suspension).

A funnel 111 is provided in the lower chamber for directing all the just dissolved limestone suspension through its neck into the lowermost center portion of the tank. Attached to the side of tank 101 is at least one vibrator 120 which constantly shakes the tank and continuously maintains the limestone powder in contact with the grating thereby preventing any arching of the quick lime contained therein.

In the lowermost portion of the tank 101 is a sedimentation chamber 112 having an emptying door 113, on the undserside thereof, which is operated automatically or manually by a hydraulically or pneumatic door opening mechanism 114 or the like. Sand, undissolved materials and other sedimentation 125, which are commonly found in quicklime, collect in the sedimentation chamber 112 and are periodically emptied as required. To empty the sedimentation chamber 112, the door opening mechanism 114 is first activated so that emptying door 113 is open. Thereafter, all of the sedimentation and fluid container in the sedimentation chamber 112 flow downward through the opening, by gravity, thereby flushing out the lower sedimentation container 112. In addition, stop valves 109 and 110 can be turned off, while stop valve 121 is opened to thoroughly wash by way of nozzles 124 any sedimentation and/or undissolved limestone which has accumulated in the chamber. If necessary, stop valve 110 may also be opened to ensure thorough cleansing of the funnel 111 via at least one nozzle 123 directed at the inner surface of the funnel.

A filter 115, which prevents any sedimentation from passing therethrough, completely surrounds the neck of funnel 111 and extends between the funnel neck and the outer tank wall, thereby separating the lower chamber 104 into the sedimentation chamber 112 and a filtered chamber 117. The dissolved limestone suspension will flow, by gravity, through the neck of funnel 111 into the lower sedimentation chamber 112 and will eventually flow upwards through the filter 115, as shown generally by arrow 116, and out through outlet 118 in filtered chamber 117 once the fluid suspension level has risen at least to the level of the outlet 118.

The filtered chamber 117 is also provided with an overflow outlet 119 which will not be utilized unless the system is somewhat clogged, thereby indicating that there is a problem within the tank. The apparatus can be set so that any flow through outlet 119 will automatically shut down the water and lime flow and the vibrators.

Although the invention has been described with specific reference to the embodiments shown, many modifications and variations of said embodiments may be made without departing from the inventive concept disclosed herein. Accordingly, all such modifications and variations are intended to be included within the spirit and scope of the appended claims.

I claim:

1. Apparatus for obtaining a limestone powder suspension and/or a solution in water comprising a tank in which the suspension occurs, and means for continuous distribution of the limestone powder and the water to the tank, and outlet means for continuously removing the suspension from the tank, the tank being divided into an upper and lower chamber by a horizontally positioned grating, characterized in that the tank is equipped with vibrating means for shaking the tank to prevent arching of the limestone powder and maintaining the limestone powder in continuous contact with the grating, the lower chamber has a plurality of nozzles pointed at the grating and arranged to spray water through the grating over substantially the entire bottom surface of the grating to carry away, in the form of a limestone suspension, the limestone powder held above the grating; said lower chamber includes funnel means and filter means, said filter means extending between the neck of the funnel means and the walls of the tank, said funnel means directs the limestone suspension downward into a funnel shaped sedimentation chamber in the lowermost portion of the tank where sedimentation and undissolved particles collect, said filter means separates said sedimentation chamber from a filtered chamber, said filtered chamber contains said outlet means, said funnel means and said funnel shaped sedimentation chamber being concentric with one another, said apparatus further including nozzles for adjusting the concentration of the limestone suspension, once the suspension level in the tank rises sufficiently said limestone suspension passes up through said filter means, thereby filtering out any undissolved particles present in the suspension, and then out through said outlet means for use.

2. An apparatus according to claim 1, characterized in that the nozzles are positioned concentrically underneath the grating.

3. An apparatus for obtaining a limestone powder suspension and/or a solution in water comprising a tank in which the suspension occurs, and means for continuous distribution of the limestone powder, the water, and the suspension to and from the tank, the top of the tank has an opening for loading of the limestone powder and is divided into an upper and lower chamber by a horizontally positioned grating, characterized in that the tank is equipped vibrating means for shaking the tank to prevent arching of the limestone powder and maintaining the limestone powder in continuous contact with the grating, three concentric ring shaped tubes protrude into the lower chamber, each having a plurality of nozzle openings pointed at the grating and arranged to substantially evenly spray water in the form of jets over the entire surface of the grating, the spray being arranged to penetrate the grating and to carry away, in the form of a limestone suspension, the limestone powder held above the grating, wherein one ring shaped tube is interconnected with a central nozzle and connected to pump means by a valve, while the other two ring shaped tubes are interconnected and connected to pump means by a valve, wherein adjustment of the valves provide concentration adjustment of the limestone suspension; said lower chamber includes funnel means and filter means, said filter means extending between the neck of the funnel means and the walls of the tank, said funnel means directs the limestone suspension downward into a funnel shaped sedimentation chamber in the lowermost portion of the tank, where sedimentation collects, said filter means separates said sedimentation chamber from a filtered chamber, said filtered chamber contains said outlet means for the filtered suspension, said funnel means and said funnel shaped sedimentation chamber being concentric with one another, once the suspension level in the tank rises sufficiently, said limestone suspension passes through said filter means, thereby filtering out any undissolved particles present in the suspension, and out through said outlet means for use.

4. An apparatus for obtaining the limestone powder suspension and/or solution in water comprising a tank in which the suspension occurs and means for continuously distributing the limestone powder and the water to said tank and outlet means for continuously removing the limestone suspension from the tank; said tank being divided into upper and lower chambers by a horizontally positioned grating, characterized in that the tank is equipped with vibrating means for shaking the tank to prevent arching of the limestone powder and maintaining the limestone powder in continuous contact with the grating, the lower chamber includes a plurality of nozzle openings pointed at the grating and arranged to substantially spray water evenly, in the form of jets, over the entire surface of the grating, the spray being arranged to penetrate the grating and carry away, in the form of a limestone suspension, limestone powder held above the grating, wherein adjustment of a second stop valve provides concentration adjustment of the limestone suspension; said lower chamber includes funnel means and filter means, said filter means extending between the neck of the funnel means and the walls of the tank, at least one nozzle directed at the inner surface of said funnel means is provided in the lower chamber to wash away and prevent accumulation of solids on the inner surface of the funnel means and adjust the concentration of the limestone suspension; said funnel means directs the limestone suspension downward into a funnel shaped sedimentation chamber in the lowermost portion of the tank where sedimentation collects, a plurality of nozzles are provided in said sedimentation chamber for washing and cleaning said sedimentation chamber during a cleaning stage; said filter means separate said sedimentation chamber from a filtered chamber above said filter means between outer walls of said funnel means and inner walls of said tank, said filtered chamber contains said outlet means, said funnel means and said funnel shaped sedimentation chamber being concentric with one another, once the suspension level in the tank rises sufficiently said limestone suspension passes through said filter means, thereby filtering out any undissolved particles present in the suspension, and out through said outlet means for use.

5. An apparatus in accordance with claim 4 wherein the filter chamber is also equipped with an overflow outlet which automatically shuts down the apparatus when overflow occurs.

6. An apparatus according to claim 1, wherein said sedimentation chamber has an emptying door for periodically removing said sedimentation.

7. An apparatus according to claim 3, wherein said sedimentation chamber has an emptying door for periodically removing said sedimentation.

8. An apparatus according to claim 4, wherein said sedimentation chamber has an emptying door for periodically removing said sedimentation.

9. An apparatus according to claim 8, wherein said limestone powder is quick lime.

10. An apparatus according to claim 1, characterized in that at least one nozzle is provided in said sedimentation chamber for washing and cleaning the inner surface of said sedimentation chamber during a cleaning stage.

11. An apparatus according to claim 3, characterized in that at least one nozzle is provided in said sedimentation chamber for washing and cleaning the inner surface of said sedimentation chamber during a cleaning stage.

12. An apparatus according to claim 1, characterized in that at least one nozzle, directed at the inner surface of said funnel means, is provided in the lower chamber to wash away and prevent accumulation of solids on said inner surface of said funnel means and adjust the concentration of the suspension.

13. An apparatus according to claim 3, characterized in that at least one nozzle, directed at the inner surface of said funnel means, is provided in the lower chamber to wash away and prevent accumulation of solids on said inner surface of said funnel means and adjust the concentration of the suspension.

* * * * *